Jan. 1, 1935.  B. F. MIESSNER  1,985,945
ELECTRIC AMPLIFYING SYSTEM
Original Filed Jan. 15, 1929
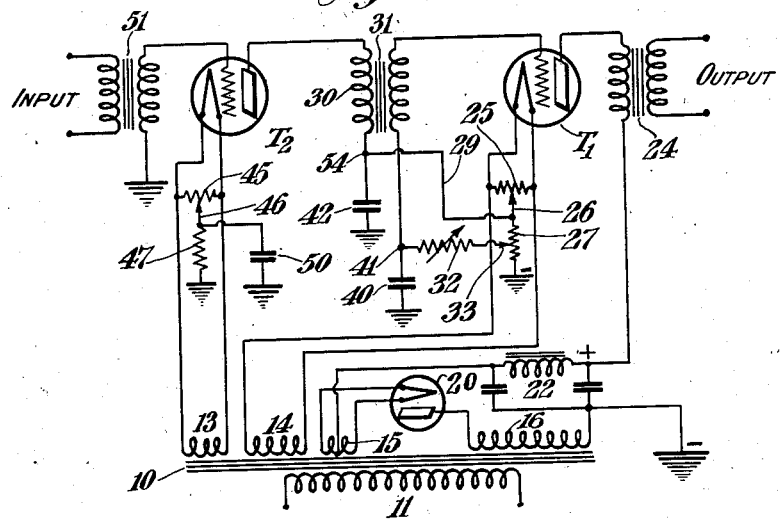
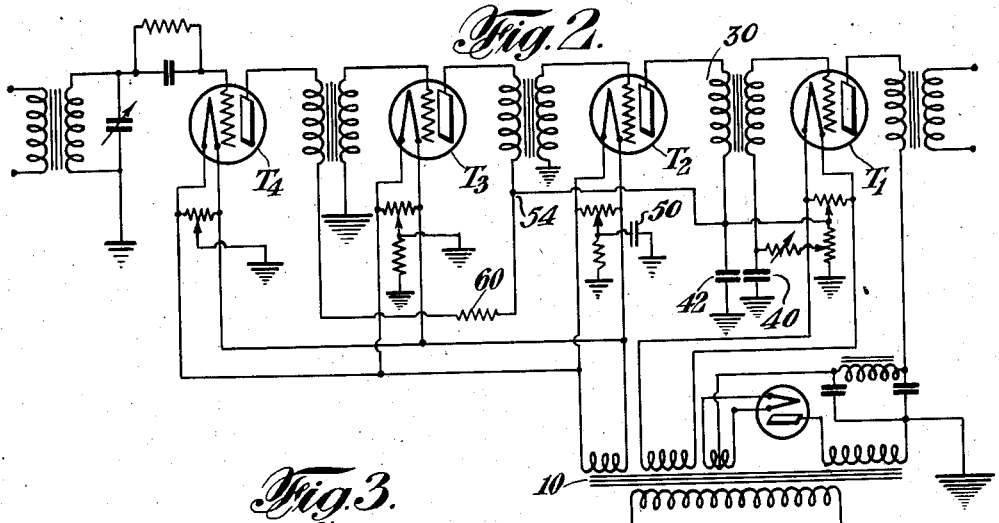
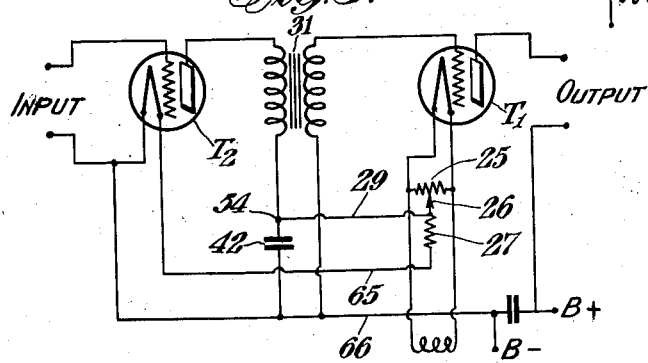
INVENTOR
Benjamin F. Miessner
BY
ATTORNEY Patented Jan. 1, 1935

1,985,945

UNITED STATES PATENT OFFICE 1,985,945

ELECTRIC AMPLIFYING SYSTEM

Benjamin F. Miessner, Short Hills, N. J., assignor, by mesne assignments, to Radio Corporation of America, New York, N. Y., a corporation of Delaware Application January 15, 1929, Serial No. 332,614
Renewed May 10, 1933

27 Claims. (Cl. 250—20)

This invention relates to electric amplifying systems employing vacuum tubes as amplifiers or repeaters and has for its principal object to provide an improved system of this character which is highly efficient in operation and exceptionally economical in the use of current employed for energizing the several tube circuits.

The sources of current customarily employed for energizing the plate circuits of the vacuum tubes are batteries or alternating current rectifiers and filters. The cost, weight and space occupied by a battery is roughly proportional to its ampere hour capacity, that is of two batteries having the same length of life, one giving a higher current costs more, weighs more and occupies more space than one giving a less current. Also the cost of rectifiers and filters employed for plate circuit supply increases with increased current capacity. The system constructed in accordance with the present invention is designed to reduce to a minimum the current supplied to the tube plate circuits and for this purpose instead of connecting all the plate circuits to the source of supply in parallel or derived circuit relation as is now customary, I connect the plate circuits of two or more tubes to the source of supply in series with one another. I am therefore able to use the B supply current a number of times as it flows through different tubes in succession.

When my invention is applied to a system employing a power tube in the last stage, which tube consumes a greater plate current than any of the remaining tubes, I preferably divide the plate return circuit of the power tube into a number of parallel circuits and use the currents in the parallel circuits for different purposes. Thus one or more of these parallel circuits may form another plate circuit or other plate circuits. Also I may if desired use part of the power tube plate return as a filament or cathode heating circuit. I may furthermore connect the grid of the power tube to some point in the plate return circuit so as to utilize the potential drop between the cathode of the power tube and such point, for supplying the desired biasing potential to the grid of the power tube.

The systems hereinafter particularly described disclose several features of advantage other than those above mentioned. Among such other features is the provision of an improved coupling between different stages of the system, which coupling may be connected with the remainder of the system in different ways so as to produce regeneration or degeneration as desired.

Additional features and objects of my invention will appear from the following description taken in connection with the accompanying drawing, wherein:

Figure 1 is a diagrammatic view showing a simple embodiment of my invention, consisting of a two stage audio frequency amplifying system; Figure 2 is a circuit diagram showing an extension of the system shown in Figure 1, to include a detector stage and one additional stage of audio frequency amplification; and Figure 3 is a circuit diagram showing a modified form of my invention.

Referring to Figure 1, T1 and T2 represent three electrode vacuum tubes in successive stages of audio frequency amplification. Tube T1 is a power tube and designed for relatively high grid and plate voltages and large plate current.

For the purpose of energizing the tube circuits I provide a transformer 10 having a primary winding 11, which may conveniently be supplied with alternating current from the usual house lighting circuit. The transformer 10 has four secondary windings 13, 14, 15 and 16, respectively. The winding 13 is connected to the filament of tube T2 and supplies current for heating the filament to its operating temperature. Winding 14 is connected to the filament of power tube T1 and supplies current for heating the filament of this tube. Windings 15 and 16 supply current respectively to the filament and plate circuit of a vacuum rectifier 20, which forms a source of supply for the plate circuits of the tubes T1 and T2; the current being supplied to the plate circuits through a filter designated by the reference character 22. The negative terminal of the filter 22 is grounded as shown and the positive terminal of the filter is connected to the plate of tube T1 through the primary 24 of a transformer, the secondary of which is connected to an output circuit which may include a translating device such as a loud speaker, not shown.

Bridged across the terminals of the filament of tube T1 is a resistance 25 and adjustable along the resistance 25 is a slider 26 which is grounded through a resistance 27. The plate of tube T2 is connected to the slider 26 through a conductor 29. The secondary of transformer 31 is connected at one end to the grid of tube T1 and at the other end through a resistance 32 to a slider 33 which is adjustable along the resistance 27. A relatively high capacity condenser 40 is connected between the ground or negative terminal of the filter and the point 41 which is between the resistance 32 and the secondary of transformer 31. A similar condenser 42 is connected between the ground and the conductor 29.

The filament supply circuit for tube T2 is shunted by a potentiometer resistance 45 which is engaged by a slider 46 grounded through the resistance 47. A relatively high capacity condenser 50 shunts the resistance 47. The grid circuit of tube T2 is grounded and includes the secondary of an input transformer 51, the primary of which may be supplied with signal current from one or more preceding stages such as a detector stage or other amplifying stages.

With the connections arranged as shown in Figure 1 the plate circuits of tubes T1 and T2 are arranged in series circuit relation with respect to one another. These circuits may be traced from the positive terminal of the filter through the primary 24 of the output transformer through the tube T1 to the filament supply circuit of this tube, through resistance 25, slider 26, conductor 29, primary 30 of transformer 31, tube T2, filament supply circuit for tube T2, resistance 45, slider 46, on resistance 47 to ground. Inasmuch as slider 26 is grounded through resistance 27, all of the plate current of tube T1 does not flow through the plate circuit of tube T2 but instead, a portion of it flows through the resistance 27 to ground, this resistance being of such value that the tube T2 receives its proper plate current and voltage, which as previously stated is less than the plate current and voltage of the power tube T1.

The drop in voltage through that portion of the resistance 27 between the slider 26 and the slider 33 is used to give the desired biasing potential to the grid of tube T1.

It will be seen that the resistances 27 and 32 are shunted by condensers 40 and 42 which condensers form low impedance paths for the signal currents in the grid circuit of tube T1 and plate circuit of tube T2. These condensers serve to reduce the coupling between the grid and plate circuits of tube T1 and so prevent any substantial signal degenerative coupling effects which might occur if the signal current flowed through resistance 27.

Resistance 47 is employed to give the desired biasing potential to the grid of tube T2. This resistance, it will be seen, is shunted by the condenser 50, which serves as a by-pass around resistance 47 for the low frequency signal currents for the grid circuit of tube T2.

The condenser 42 may serve an additional useful function in the system shown in Figure 1. This condenser, it will be seen, constitutes a coupling between the plate circuit of tube T2 and the plate and grid circuits of tube T1. This coupling if properly connected may be employed to produce regenerative effects which are inversely proportional to the frequency of the signal currents. As this coupling is a capacity coupling, its effectiveness decreases with frequency and provides a signal voltage applied to the plate circuit of tube T2 whose magnitude increases as the frequency is lowered. Thus the low frequency signal currents, which in systems now in use are not amplified to as great a degree as the higher frequencies, may in my improved system be amplified to an extent equal to that of the higher frequencies. It will of course be understood that this coupling will not be made sufficiently great as to cause the amplifier to oscillate at some very low frequency. If the coupling phase between the tubes T1 and T2 be reversed by reversing either winding of the coupling transformer 31, the low frequency signal currents may, if desired, be reduced.

In Figure 1, I have shown two tubes with their plate circuits arranged in series relation. It will be understood that in addition to the tube T2 I may if desired employ other tubes, the plate circuit of each of which is in series with the plate circuit of tube T1. The plate circuit of tube T2 and the plate circuits of each additional tube will in general be connected in parallel circuit relation to one another. Such additional tubes may for example be a first audio frequency amplifying tube and all of the radio frequency amplifying tubes of the receiving system and in addition the detector tube whose plate may be connected to the point 54 at the positive side of the condenser 42 through a voltage reducing resistor.

In Figure 2 I show by way of illustration an extension of the system of Figure 1 to include a first stage of audio frequency amplification preceded by a detector stage. In this Figure T3 represents an audio frequency amplifying tube in the first stage of audio amplification and T4 represents a detector tube. As will be seen the plates of tubes T3 and T4 are connected to the point 54 at the positive side of the condenser 42, this point being the positive potential point for the plate circuits of the tubes T2, T3 and T4. Plate circuits of tubes T2 and T3 are arranged in parallel with one another and the plate circuit of the detector tube is in parallel with each of the plate circuits of tubes T2 and T3, a suitable voltage reducing resistance 60 being employed in the lead to the plate of the detector tube to provide the desired low plate voltage for operation of this tube.

In Figure 2 I show the detector tube and first audio tube of the directly heated type, that is tubes having filament cathodes which are heated to operating temperature by current passed therethrough. I may however, if desired, employ a detector tube and first audio tube of the indirectly heated cathode type. When tubes of the later type are used in the system shown in Figure 2, the circuit arrangement shown in this figure provides for preventing excessive voltage being applied to the condenser 42 during the initial period of slow heating of the tube cathodes and the same safeguard is had when these tubes are removed for any reason while the system is energized. This feature is mentioned because in the usual system where the potentials for the first audio tube, the radio amplifier tubes and the detector tube are taken from the full potential of the filter through potential reducing resistances, the removal of these tubes or their inactivity during the heating up period of the indirectly heated cathode type results in the high potential of the filter available for the power amplifier tube being applied to the filter condensers of the plate supply circuits of the low potential tubes. Since for economical reasons it is desirable to use filter condensers designed to withstand the lower operating potentials only, these transient high potentials endanger these condensers, and often damage them. In my present system the low potential tubes are permanently connected across their fractional part of the total filter potential, so that removal of the tubes or inactivity of them cannot raise the potential to excessive values.

In Figure 3 I show a modified circuit arrangement wherein part of the plate current of the power tube T1 serves as the plate current of the preceding amplifier tube T2 and the remainder of the plate current of tube T1 is employed for heating the filament of tube T2. In this figure the lower end of resistance 27, instead of being directly grounded or connected with the negative terminal of the filter, is connected by a wire 65 to one terminal of the filament of tube T2, the other terminal of the filament being connected by a wire 66 to the negative terminal of the filter. Tracing the plate circuit of tube T1 in Figure 3, current from the positive terminal B+ of the filter passes to the plate of tube T1, thence to the filament and to the slider 26 on the resistance 25. The current then divides, a portion passing through conductor 29 and primary of transformer 31, to the plate of tube T2 and thence to the filament of tube T2 and back to the negative terminal of the filter. The remainder of the plate current of tube T1 flows from the slider 26 through resistance 27, conductor 65, filament of tube T2, conductor 66, back to the negative terminal B— of the filter. The plate current of tube T1 thus serves as the plate current of tube T2 and also as the filament heating current of tube T2.

It will be seen that in the circuit arrangement of Figure 3, the grid of tube T1 is connected through the secondary of transformer 31 with the negative terminal of the filter and that the filament supply circuit of tube T1 is connected to the negative terminal of the filter through two paths, one including the plate circuit of tube T2 and the other including the resistance 27 and the filament of tube T2. The resistance of these two paths is such as to give the required biasing voltage to the grid of tube T1. It will be understood that, in addition to tube T2, I may employ several tubes deriving their plate currents from the source of supply through the plate circuit of the power tube T1 and with their several filaments arranged in series with one another and in series with the plate circuit of tube T1.

While I have indicated and described several systems for carrying my invention into effect, it will be apparent to one skilled in the art that my invention is by no means limited to the particular organizations shown and described, but that many modifications may be made without departing from the scope of my invention as set forth in the appended claims.

Having thus described my invention, what I claim is:

1. A multi-stage amplifying system comprising vacuum tubes having coupled plate and grid circuits, means, including a source of potential, providing a potential drop connected for energizing the grid of one tube, and connections to said means, including the plate to cathode path of said one tube for utilizing the same said potential drop for energizing the plate circuit of another tube in said system.

2. A multi-stage amplifying system comprising vacuum tubes having plate and grid circuits non-conductively connected in cascade, a source of current connected positively to the plate circuit of the last tube and negatively to the filament thereof by way of a resistance, and connections for independently energizing the grid circuit of said last tube and the plate circuit of a preceding tube with the difference of potential developed by the current flow in said resistance.

3. A multi-stage amplifying system comprising vacuum tubes having plate and grid circuits non-conductively connected in cascade, a source of current connected positively to the plate circuit of one of said tubes and negatively to the filament thereof by way of a resistance, and connections for independently energizing the grid circuit of said tube and the plate circuit of a preceding tube of the system with the difference of potential developed by the current flow in said resistance.

4. A multi-stage amplifying system comprising vacuum tubes having plate and grid circuits non-conductively connected in cascade, a source of current connected positively to the plate circuit of one of said tubes and negatively to the filament thereof by way of a resistance, and connections for independently negatively energizing the grid of said tube and positively energizing the plate of a preceding tube of the system with the difference of potential developed by the current flow in said resistance.

5. A multi-stage amplifying system comprising vacuum tubes having plate and grid circuits non-conductively connected in cascade, a source of current connected positively to the plate circuit of one of said tubes and negatively to the filament thereof by way of a resistance, connections for energizing the grid circuit of said tube negatively with the difference of potential developed by the current flow in said resistance, connections for positively energizing the plate circuits of a plurality of preceding tubes with said developed difference of potential, and means for reducing the potential supplied to the plate circuit or circuits of one or more of said preceding tubes.

6. A multi-stage amplifying system comprising vacuum tubes having plate and grid circuits non-conductively connected in cascade, a source of current connected positively to the plate circuit of one of said tubes and negatively to the filament thereof by way of a filament of a preceding tube and a resistance, connections for negatively energizing the grid circuit of said first tube with the difference of potential developed by current flow in said resistance, and connections for positively energizing the plate circuit or circuits of one or more preceding tubes with said developed difference of potential.

7. A multi-stage signal current amplifying system comprising vacuum tubes having plate and grid circuits non-conductively connected in cascade, a source of current connected positively to the plate circuit of one of said tubes and negatively to the filament thereof by way of a resistance, connections for independently negatively energizing the grid of said tube and positively energizing the plate of a preceding tube of the system with the difference of potential developed by the current flow in said resistance, and low impedance means for by-passing signal current around said resistance.

8. A multi-stage amplifying system comprising vacuum tubes having non-conductively coupled plate and grid circuits, a source of potential and means including a common impedance, and the plate to cathode path of one tube for energizing the grid circuit of said one tube and the plate circuit of another tube from the same source of potential.

9. A multi-stage amplifying system comprising vacuum tubes having plate and grid circuits non-conductively connected in cascade, a source of current connected positively to the plate circuit of the last tube and negatively to the filament thereof by way of a resistance, and connections for independently energizing the grid circuit of said last tube and the plate circuit of a preceding tube with the difference of potential developed by the current flow in said resistance, said last tube grid circuit being connected to a point of said resistance of lower potential than the point of said resistance to which the said preceding plate circuit is connected.

10. A multi-stage amplifying system comprising vacuum tubes having plate and grid circuits non-conductively connected in cascade, a source of current connected positively to the plate circuit of the last tube and negatively to the filament thereof by way of a resistance, and connections for independently energizing the grid circuit of said last tube and the plate circuit of a preceding tube with the difference of potential developed by the current flow in said resistance, said last tube grid circuit being adjustably connected to a point of said resistance of lower potential than the point of said resistance to which the said preceding plate circuit is connected.

11. A multi-stage amplifying system comprising vacuum tubes having plate and grid circuits non-conductively connected in cascade, a source of current connected positively to the plate circuit of the last tube and negatively to the filament thereof by way of a resistance, and connections for independently energizing the grid circuit of said last tube and the plate circuit of a preceding tube with the difference of potential developed by the current flow in said resistance, said last tube grid circuit and preceding tube plate circuit being connected to different points on said resistance.

12. A multi-stage amplifying system comprising vacuum tubes having plate and grid circuits non-conductively connected in cascade, a source of current connected positively to the plate circuit of the last tube and negatively to the filament thereof by way of a resistance, and connections for independently energizing the grid circuit of said last tube and the plate circuit of a preceding tube with the difference of potential developed by the current flow in said resistance, said preceding tube being disposed in a detector stage, and its said plate circuit being connected to a point on said resistance of higher potential than the point to which said last tube grid circuit is connected.

13. A multi-stage amplifying system comprising vacuum tubes having plate and grid circuits non-conductively connected in cascade, a source of current connected positively to the plate circuit of the last tube and negatively to the filament thereof by way of a resistance, and connections for independently energizing the grid circuit of said last tube and the plate circuit of a preceding tube with the difference of potential developed by the current flow in said resistance, and means for adjusting the energization of said last tube grid circuit.

14. A multi-stage amplifying system comprising vacuum tubes having plate and grid circuits non-conductively connected in cascade, a source of current connected positively to the plate circuit of one of said tubes and negatively to the filament thereof by way of a resistance, and connections for independently energizing the grid circuit of said tube and the plate circuit of a preceding tube of the system with the difference of potential developed by the current flow in said resistance, said resistance being of such a magnitude that said preceding plate circuit receives less voltage than the plate circuit of said first mentioned tube.

15. A multi-stage amplifying system comprising vacuum tubes having plate and grid circuits non-conductively connected in cascade, a source of current connected positively to the plate circuit of one of said tubes and negatively to the filament thereof by way of a resistance, and connections for independently energizing the grid circuit of said tube and the plate circuit of a preceding tube of the system with the difference of potential developed by the current flow in said resistance, and additional means for biasing the grid of said preceding tube.

16. A multi-stage amplifying system comprising vacuum tubes having plate and grid circuits non-conductively connected in cascade, a source of current connected positively to the plate circuit of one of said tubes and negatively to the filament thereof by way of a resistance, and connections for independently energizing the grid circuit of said tube and the plate circuit of a preceding tube of the system with the difference of potential developed by the current flow in said resistance, and a low impedance capacitative path coupling said preceding plate circuit and the plate and grid circuits of said first mentioned tube.

17. A multi-stage amplifying system comprising vacuum tubes having plate and grid circuits non-conductively connected in cascade, a source of current connected positively to the plate circuit of one of said tubes and negatively to the filament thereof by way of a resistance, and connections for independently energizing the grid circuit of said tube and the plate circuit of a preceding tube of the system with the difference of potential developed by the current flow in said resistance, a capacity connected to said preceding plate circuit and in shunt with said resistance, and a second capacity connected to the grid circuit of said first tube and in shunt with said resistance.

18. A multi-stage amplifying system comprising vacuum tubes having plate and grid circuits non-conductively connected in cascade, a source of current connected positively to the plate circuit of the last tube and negatively to the filament thereof by way of a resistance, and connections for independently energizing the grid circuit of said last tube and the plate circuit of a preceding tube with the difference of potential developed by the current flow in said resistance, said preceding tube being included in a detector stage, and said preceding plate circuit being connected to said resistance through a voltage reducing impedance.

19. A multi-stage amplifying system comprising vacuum tubes having plate and grid circuits non-conductively connected in cascade, a source of current connected positively to the plate circuit of the last tube and negatively to the filament thereof by way of a resistance, and connections for independently energizing the grid circuit of said last tube and the plate circuit of a preceding tube with the difference of potential developed by the current flow in said resistance, a detector tube coupled to said preceding tube, and means for connecting the detector plate circuit to said resistance.

20. A multi-stage amplifying system comprising vacuum tubes having plate and grid circuits non-conductively connected in cascade, a source of current connected positively to the plate circuit of the last tube and negatively to the filament thereof by way of a resistance, and connections for independently energizing the grid circuit of said last tube and the plate circuit of a preceding tube with the difference of potential developed by the current flow in said resistance, and the cathode of said preceding tube being connected in series with said resistance.

21. In a radio receiver, a detector tube having an anode circuit, at least one audio amplifier tube having a control grid circuit, said circuits being non-conductively connected to each other in cascade, an anode in said audio amplifier tube, a source of current for energizing the electrodes of said tubes, the anode of the audio tube being connected to a point of positive potential of said source, a second connection between the cathode of the audio tube and a point of negative potential of the said source, said last connection including a control grid bias resistor, a third connection from the control grid of the audio tube to a point on said bias resistor, a connection for applying a desired positive potential to the anode of said detector tube, and an audio frequency feed-back condenser, of low impedance to audio frequency currents, connected between the anode of said detector tube and a point on said second connection adjacent one side of the bias resistor.

22. In combination with a receiver network including a detector tube and audio amplifier tube coupled in cascade, a source of energizing potential for the said tubes, connections for applying positive potentials, derived from said source, to the anodes of said tubes, an impedance in the space current circuit of the audio tube, and a condenser connected from a point in the said space current circuit between the audio tube cathode and said impedance and the anode circuit of the detector tube for feeding back alternating current potentials developed across said impedance.

23. In combination with a receiver network including a detector tube and audio amplifier tube coupled in cascade, a source of energizing potential for the said tubes, connections for applying positive potentials, derived from said source, to the anodes of said tubes, an impedance in the space current circuit of the audio tube, a connection between the control grid of the audio tube and said impedance, and a condenser connected from a point in the said space current circuit between the audio tube cathode and said impedance and the anode circuit of the detector tube for feeding back alternating current potentials developed across said impedance.

24. In combination with a receiver network including a detector tube and audio amplifier tube coupled in cascade, a source of energizing potential for the said tubes, connections for applying positive potentials, derived from said source, to the anodes of said tubes, an impedance in the space current circuit of the audio tube, the cathodes of said detector and audio tubes being at relatively invariant direct current potentials, and a condenser connected from a point in the said space current circuit between the audio tube cathode and said impedance and the anode circuit of the detector tube for feeding back alternating current potentials developed across said impedance.

25. In a receiver network, at least two non-conductively cascaded tubes, a source of energizing potential for the electrodes of the tubes, each tube being provided with a cathode and a plurality of cold electrodes, a biasing resistor in the space current circuit of the second of said tubes, a connection from the positive side of said source to a cold electrode of the second tube, a second connection from another cold electrode of the second tube to said bias resistor, and a third connection from a cold electrode of the first of said tubes to a point of said bias resistor which is at a positive potential with respect to the point to which the second connection is made.

26. In a receiver network, at least two non-conductively cascaded tubes, a source of energizing potential for the electrodes of the tubes, each tube being provided with a cathode and a plurality of cold electrodes, a biasing resistor in the space current circuit of the second of said tubes, a connection from the positive side of said source to a cold electrode of the second tube, a second connection from another cold electrode of the second tube to said bias resistor, and a third connection from a cold electrode of the first of said tubes to a point of said bias resistor which is at a positive potential with respect to the point to which the second connection is made, a biasing resistor in the cathode circuit of the first tube, and a fourth connection between another cold electrode of the first tube and the last named bias resistor.

27. A multi-stage system comprising electron discharge tubes having output and input circuits non-conductively connected in cascade, a source of current connected positively to the plate circuit of the last tube and negatively to the cathode of the last tube by way of a resistance, and connections for independently energizing the control grid circuit of the last tube and a positive cold electrode circuit of a preceding tube with the difference of potential developed by the current flow in said resistance.

BENJAMIN F. MIESSNER.